(12) United States Patent
Nakano

(10) Patent No.: US 6,795,657 B1
(45) Date of Patent: Sep. 21, 2004

(54) CIRCUIT AND METHOD FOR MONITORING OPTICAL SIGNAL LEVEL

(75) Inventor: Masayuki Nakano, Tokyo (JP)

(73) Assignee: NEC Corporation, Tokyo (JP)

( * ) Notice: Subject to any disclaimer, the term of this patent is extended or adjusted under 35 U.S.C. 154(b) by 493 days.

(21) Appl. No.: 09/645,497

(22) Filed: Aug. 25, 2000

(30) Foreign Application Priority Data

Aug. 27, 1999 (JP) ............................................. 11-242222

(51) Int. Cl.[7] .................. H04B 10/00; H04B 10/06; H04B 17/00; H04Q 1/20; H04L 7/02
(52) U.S. Cl. .................. 398/202; 398/155; 398/206; 398/210; 375/227; 375/228; 375/359
(58) Field of Search .............................. 398/202, 206, 398/210, 155; 375/224, 227, 228, 359, 361

(56) References Cited

U.S. PATENT DOCUMENTS 5,305,323 A * 4/1994 Lada ........................ 371/5.1
6,356,302 B1 * 3/2002 Kawakami et al. ......... 348/193

FOREIGN PATENT DOCUMENTS

| JP | 63-23432 | 1/1988 |
| JP | 05-037473 | 2/1993 |
| WO | WO 98/00943 | 1/1998 |
| WO | WO 99/59272 | 11/1999 |

OTHER PUBLICATIONS

Japanese Office Action dated Apr. 2, 2002, with partial translation.
European Search Report dated Aug. 13, 2003.

* cited by examiner

Primary Examiner—M. R. Sedighian
(74) Attorney, Agent, or Firm—McGinn & Gibb, PLLC

(57) ABSTRACT

A circuit for monitoring an optical signal level provided in an optical receiver includes a clock extraction circuit, a noise detection circuit, and an alarm circuit. The clock extraction circuit extracts a clock from an input signal. The noise detection circuit multiplies the clock, utilizes the multiplied clock to identify surge noises included in the input signal, and outputs noise pulses. The alarm circuit counts the noise pulses and outputs an alarm signal when the number of the pulses counted within a certain period reaches a preset value. The surge noise is a noise having a level which is relatively increased as the input signal level is lowered.

12 Claims, 6 Drawing Sheets

CIRCUIT AND METHOD FOR MONITORING OPTICAL SIGNAL LEVEL

BACKGROUND OF THE INVENTION

1. Field of the Invention

The present invention relates to a circuit for monitoring an optical signal level, and more particularly, to a circuit for monitoring an optical signal level which detects a reduction in a received optical signal level and outputs an alarm. In addition, the present invention relates to a method for monitoring the optical signal level and an optical receiver.

2. Description of the Related Prior Art

Conventional circuits for monitoring an optical signal level, which are installed in an optical receiver, monitor an amplitude of a clock extracted from a received signal and output an alarm signal when the value of the amplitude is lowered below a reference level. Such circuits, however, can not exactly detect any optical signal level due to a noise which is generated by an APD (avalanche photodiode), a photoelectric transducer element, when the optical signal level is lowered.

Japanese Patent Application Laid-Open No. 5-37473 discloses another circuit for monitoring the optical signal level. In this circuit, a timing extract circuit extracts a clock signal from an input data signal and sends the clock signal to a first detector, which, in turn, outputs a direct current signal corresponding to the level of the clock signal to a subtracter. On the other hand, a band pass filter outputs, for example, a low frequency band of the data signal to a second detector. The output of the second detector is output to the above described subtracter. The subtracter subtracts the output of the second detector from the output of the first detect or and outputs the result of the subtraction to a comparator. In the case where the input optical level is significantly low, a relatively high noise with respect to the input signal is output from an APD. However, since the levels of the noises output from the first and second detectors respectively are substantially equal, the output signal from the subtracter does not include any noise level, and is stably detected by a comparator. Accordingly, the reduction in the input signal level or break in the input signal can be detected However, this circuit for monitoring the optical signal level comprises t he band pass filter for obtaining a compensating output for preventing malfunction due to the noise. Therefore, this circuit is complex, and since the entire circuit is configured by analog circuits, it is difficult to integrate the circuit.

SUMMARY OF THE INVENTION

Therefore, an object of the present invention is to provide a circuit for monitoring optical signal level, which is configured by digital circuits, is readily integrated, and operates with stability. And another object of the present invention is to provide a method for monitoring an optical signal level by using the circuit and an optical receiver using this circuit.

A circuit for monitoring an optical signal level according to the present invention comprises a clock extraction circuit, a noise detection circuit, and an alarm circuit. The clock extraction circuit extracts a clock from an input signal, and the noise detection circuit detects surge noises included in the input signal. And the alarm circuit counts noise pulses output from the noise detection circuit, and outputs an alarm signal based on the number of the counted pulses. The above described noise detection circuit can comprise a frequency multiplier, which multiplies the frequency of the clock and outputs the multiplied clock, and a noise identification circuit, which utilizes the multiplied clock to identify surge noises and outputs a noise detection signal including noise pulses. The alarm circuit can comprise a pulse generator and alarm decision circuit. The pulse generator generates a window pulse having a predetermined period, and the alarm decision circuit counts the noise pulses detected within the period of the window pulse, and outputs an alarm pulse when the number of the counted noise pulses reaches a preset value. In addition, the circuit for monitoring the optical signal level can comprise an alarm protection circuit. The alarm protection circuit expands the period of the window pulse, counts the alarm pulses within the expanded period, and outputs the alarm signal when the number of the counted pulses reaches a preset value. A method for monitoring the optical signal level according to the present invention comprises the following steps: that is, detecting the surge noises included in the input signal as pulses, counting the number of the pulses within a predetermined period, and outputting the alarm signal when the number of the counted pulses reaches a preset value. The surge noise is a noise having a level which is relatively increased as the optical signal level is lowered. An optical receiver provided with the circuit for monitoring the optical signal level according to the present invention comprises a light receiving element for receiving the input signal light and outputting an electric signal, a control circuit for controlling the light receiving element based on the output of the light receiving element, a clock extraction circuit for extracting the clock from the output signal from the light receiving element, an identification circuit for identifying the data signal based on the clock, a noise detection circuit for detecting the surge noises included in the input signal, and an alarm circuit for counting the noise pulses output from the noise detection circuit and outputting the alarm signal when the number of the counted pulses reaches a preset value.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
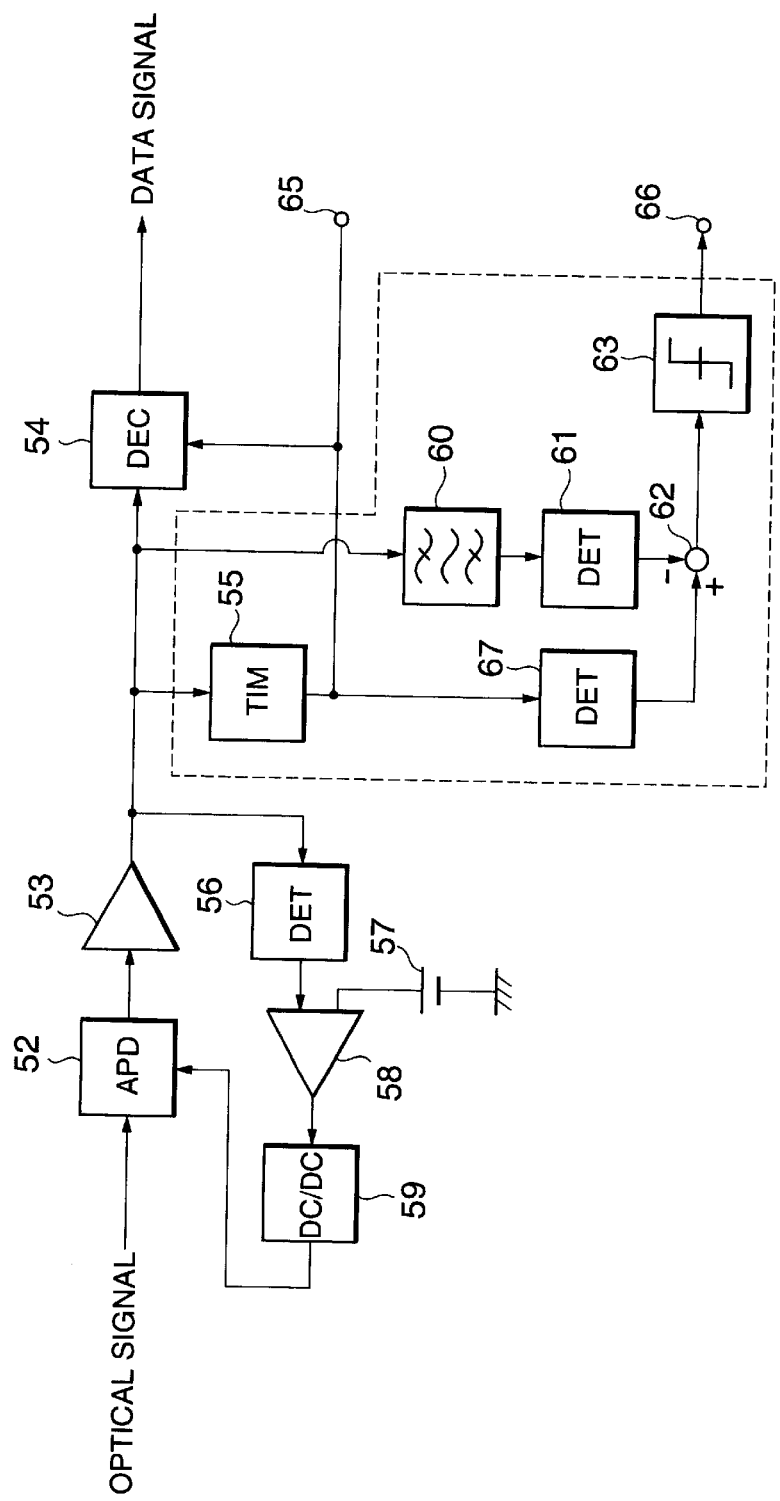
FIG. 1 is a block diagram illustrating an optical receiver provided with a conventional circuit for monitoring an optical signal level.

Referring to FIG. 1, in an optical receiver to which a conventional circuit for monitoring an optical signal level is applied, an optical signal, which has had its intensity modulated by a data signal, is converted into an electric signal by an APD 52 and then amplified by an amplifier 53. This electric signal is input to each of a decision circuit 54, timing extract circuit 55, and detector 56. The output of the detector 56 is compared with a reference voltage 57 and amplified in a comparator/amplifier 58, and is input to an APD bias circuit 59 to control the APD 52. The timing extract circuit 55 extracts a clock from the data signal and deliver the clock to the decision circuit 54, clock output terminal 65, and detector 67. The decision circuit 54 utilizes the clock signal to identify the data signal, regenerates and outputs the data signal. The detector 67 outputs a direct current signal corresponding to the clock signal level to a subtracter 62. A band pass filter 60 outputs a low frequency region in the band of the data signal to a detector 61, which, in turn, outputs a direct current signal corresponding to the level of the signal input thereto to the subtracter 62. The subtracter 62 subtracts the output of the detector 61 from the output of the detector 67, and outputs the result of the subtraction to a comparator 63. Thus, the comparator 63 can receive the data signal without noise and detect a break in the optical input with stability. However, since the above described circuit for monitoring the optical signal level is provided with analog circuits, it is difficult to integrate the circuit.

Figure 2:
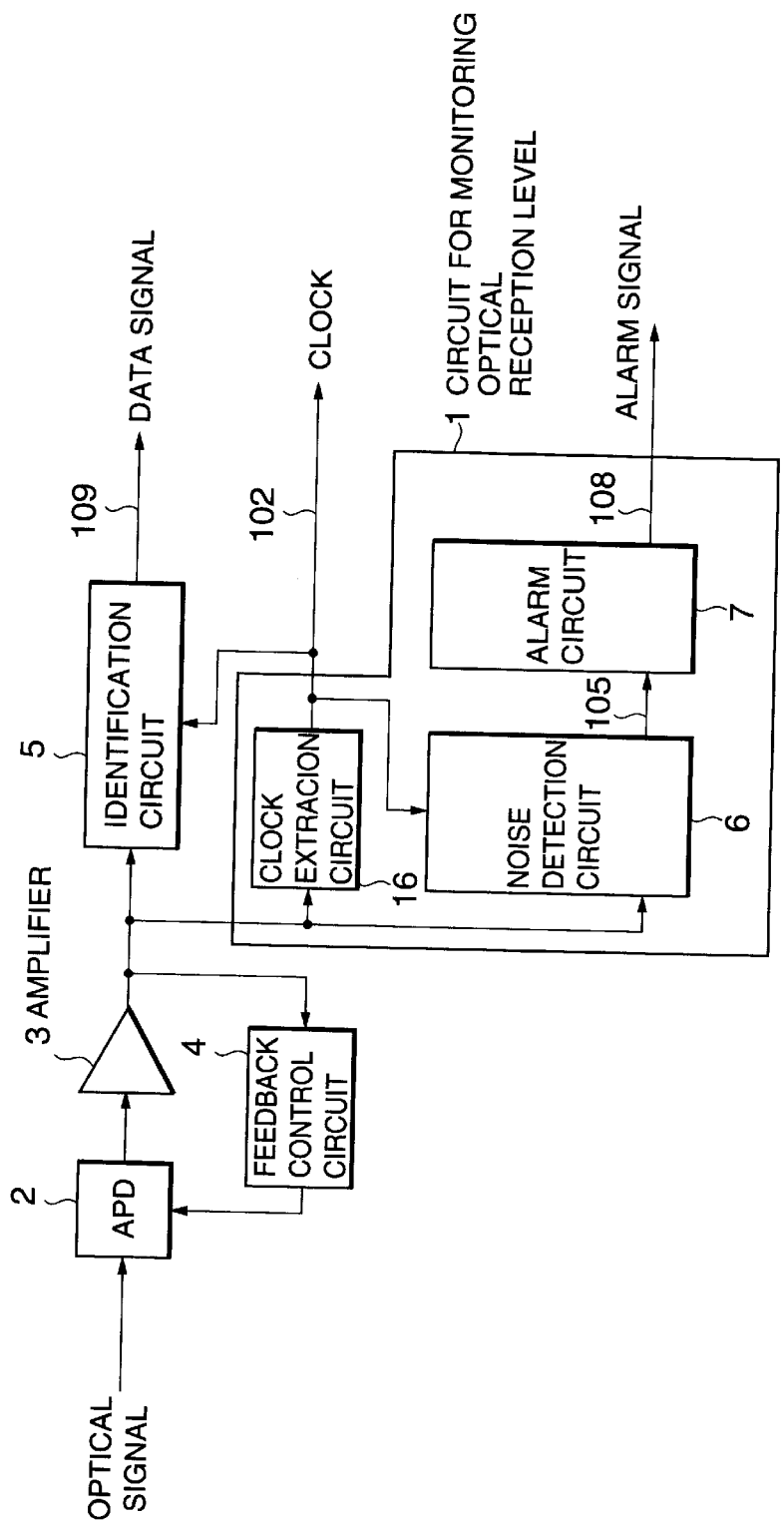
FIG. 2 is a block diagram illustrating an optical receiver provided with a circuit for monitoring an optical signal level according to the present invention.

Referring to FIG. 2, in the optical receiver to which a circuit 1 for monitoring an optical signal level according to the present invention is applied, firstly, an APD 2 converts the optical signal, which has had its intensity modulated by a data signal, into an electric signal. An amplifier 3 amplifies the electric signal and outputs it to an identification circuit 5 and feedback control circuit 4, as well as to a clock extraction circuit 16 and noise detection circuit 6, which are components of the circuit 1 for monitoring the optical signal level. The feedback control circuit 4 outputs a control signal to the APD 2 based on the output of the amplifier 3. The identification circuit 5 utilizes the clock 102 output from the clock extraction circuit 16 to identify the data signal 109 from the input signal and outputs the data signal. The circuit 1 for monitoring the optical signal level essentially comprises the clock extraction circuit 16, noise detection circuit 6, and alarm circuit 7. The clock extraction circuit 16, which is an active circuit utilizing a phase-locked loop circuit (PLL), extracts the clock 102 from the input signal 101 and outputs the clock. In addition, this circuit 16 continues to output a clock having a specific frequency, even if the level of the optical signal input to the APD 2 becomes zero. The noise detection circuit 6 receives the input signal 101 and clock 102 to identify the data signal and outputs it. However, when surge noises are introduced to the input signal, this circuit 6 outputs a noise detection signal 105, which is the data signal on which the noise pulses are superimposed. The alarm circuit 7 receives the noise detection signal 105, counts the noise pulses generated within a predetermined period, and outputs an alarm pulse 107 when the number of the counted noise pulses reaches a preset value. When the level of the optical signal input to the APD 2 is lowered or becomes zero, the APD 2 increases the amplification factor of the optical signal based on the control signal from the feedback control circuit 4. This result in the noise level being relatively increased. Then, the circuit 1 for monitoring the optical signal level according to the present invention counts the surge noises as the noise pulses, recognizes the reduction in the optical signal level or the break in the optical signal based on the number of the counted noise pulses, and outputs the alarm.

Figure 3:
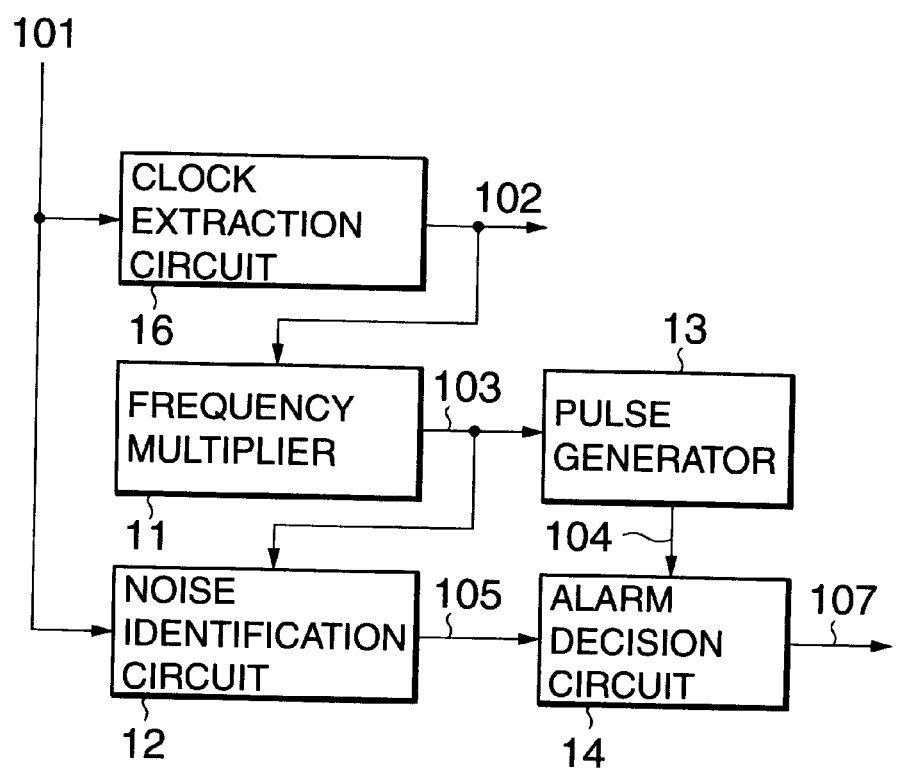
FIG. 3 is a block diagram illustrating another example of a circuit for monitoring an optical signal level according to the present invention.

Referring to FIG. 3, in another example of the circuit for monitoring the optical signal level according to the present invention, the noise detection circuit 6 comprises a frequency multiplier 11 and noise identification circuit 12. The frequency multiplier 11 receives the clock 102 and multiplies the frequency of the clock by a factor of a predetermined number. The noise identification circuit 12 receives the multiplied clock 103, and utilizes the multiplied clock 103 to identify and regenerate the input signal 101. When relatively high level surge noises are introduced to the input signal, the noise identification circuit 12 utilizes the multiplied clock 103 to recognize the noises, and outputs a noise detection signal 105, which is the data signal on which the noise pulses are superimposed. Furthermore, the alarm circuit 7 comprises a pulse generator 13 and alarm decision circuit 14. The pulse generator 13 generates a window pulse 104 having a predetermined period and being synchronized with the multiplied clock 103, and outputs it to the alarm decision circuit 14. The alarm decision circuit 14 receives the window pulse 104 and noise detection signal 105, and counts the noise pulses generated within the period of the window pulse 104. In addition, this circuit 14 outputs an alarm pulse 107 when the number of the counted noise pulses reaches a preset value. The number of pulses for the alarm decision circuit 14 can be externally and arbitrarily set in advance.

Figure 4:
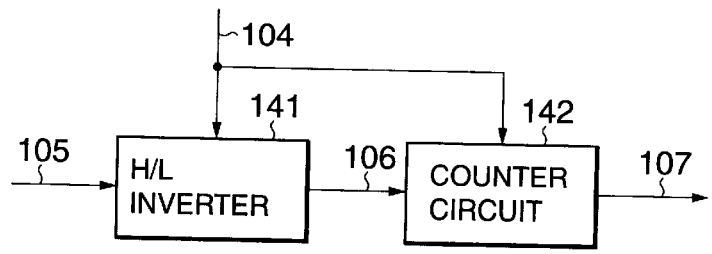
FIG. 4 is a block diagram illustrating still another example of a circuit for monitoring an optical signal level according to the present invention.

Referring to FIG. 4, the above described alarm decision circuit 14 comprises, for example, an H/L inverter 141 and counter circuit 142. The H/L inverter 141 receives the noise detection signal 105 and window pulse 104, inverts the H level portion of the data signal to the L level, and outputs the noise pulses 106. The counter circuit 142 counts the noise pulses 106 within the period of the window pulse 104, and outputs the alarm pulse 107 when the number of the counted noise pulses reaches a predetermined value.

Figure 5:
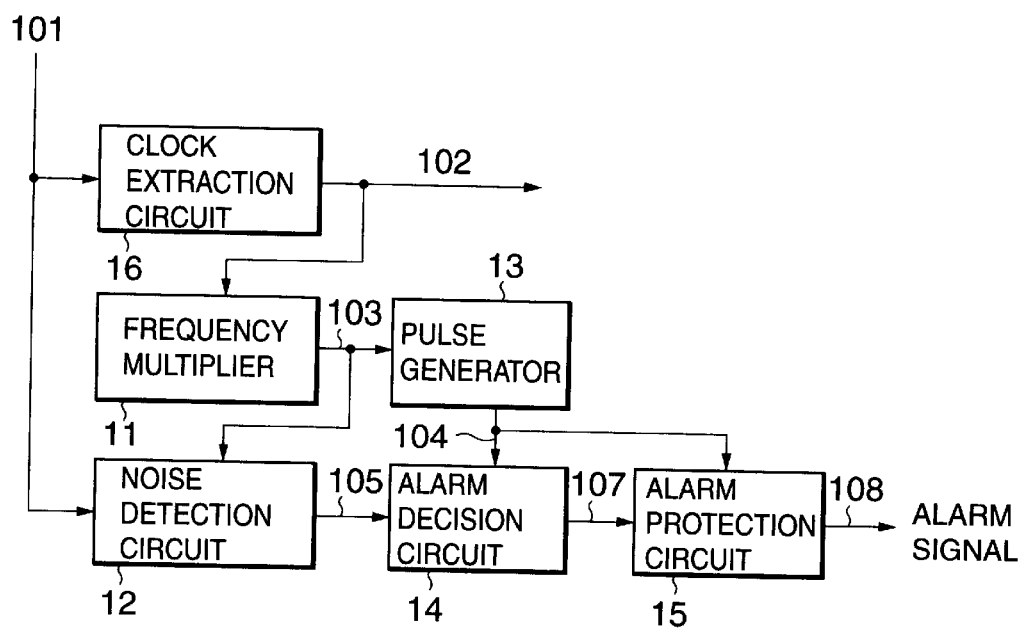
FIG. 5 is a block diagram illustrating an embodiment of an alarm decision circuit.

Referring to FIG. 5, in still another example of the circuit for monitoring the optical signal level according to the present invention, an alarm protection circuit 15 is also provided. The alarm protection circuit 15 receives the window pulse 104 and alarm pulse 107. This circuit 15 expands the period of the window pulse 104 to generate an expanded window pulse. The circuit 15 counts the alarm pulses 107 generated within the period of the expanded window pulse, and outputs a continuous alarm signal 108 when the number of the counted alarm pulses reaches a preset value. This protection circuit 15 may prolong the time for detecting noises to prevent the false detection of noise in the case where a high noise is temporarily generated for reasons other than the reduction in the optical signal level.

Figure 6:
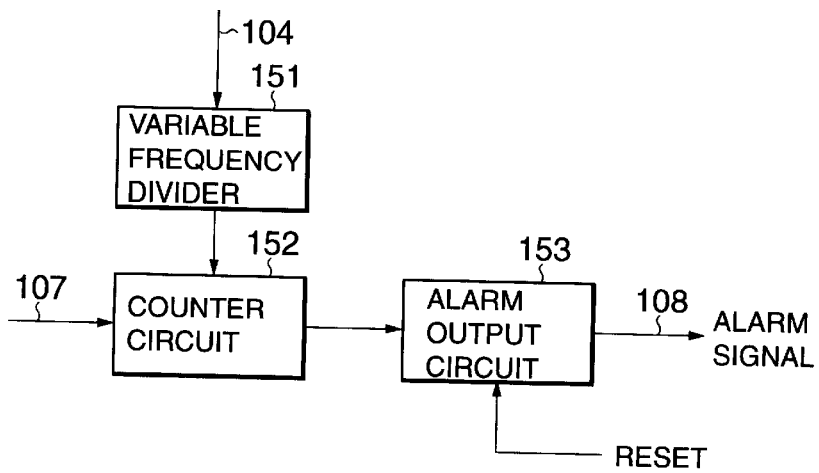
FIG. 6 is a block diagram illustrating an embodiment of an alarm protection circuit.

Referring to FIG. 6, the above described alarm protection circuit 15 comprises, for example, a variable frequency divider 151, counter circuit 152, and alarm output circuit 153. The variable frequency divider 151 receives the window pulse 104, and expands the period of the window pulse to generate the expanded window pulse. The counter circuit 152 counts the alarm pulses 107 within the period of the expanded window pulse, and outputs a count pulse when the number of the counted alarm pulses reaches a preset value. The alarm output circuit 153 holds the count pulse and outputs the continuous alarm signal 108. The alarm output circuit 153 stops outputting the alarm signal 108 when it receives a reset signal. The periods of the above described window pulse and expanded window pulse can be arbitrarily modified.

Figure 7:
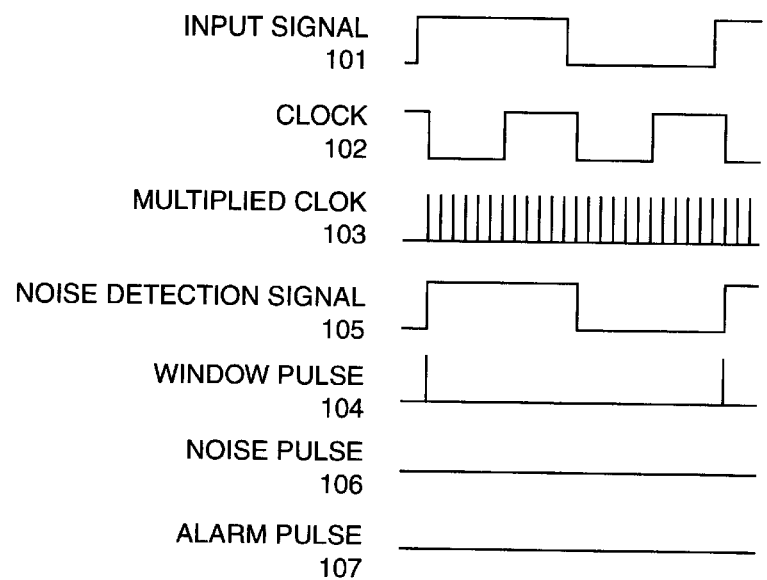
FIG. 7 is a diagram illustrating an example of signals in the circuit for monitoring an optical signal level when the optical signal is normally received.
Figure 8:
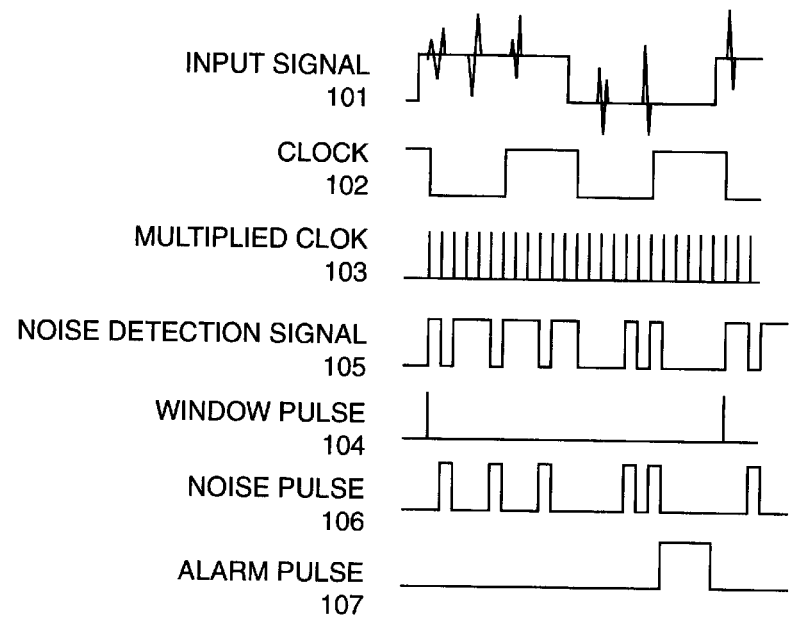
FIG. 8 is a diagram illustrating an example of signals in the circuit for monitoring an optical signal level when the received optical signal level is lowered.

Next, referring to FIGS. 3, 7, 8, examples of the operation of the circuit for monitoring the optical signal level according to the present invention will be explained. First, an example of the operation in the case where the optical signal level is proper, and the noise is negligible will be explained with reference to FIGS. 3 and 7. The input signal 101 has a pattern of alternating Hs and Ls. The clock extraction circuit 16 extracts the clock 102 having a frequency twice as high as the frequency of the input signal 101, and outputs the clock to the frequency multiplier 11. The frequency multiplier 11 generates the multiplied clock 103 having a frequency 16 times as high as the frequency of the clock 102, and outputs the multiplied clock to the noise identification circuit 12. The noise identification circuit 12 utilizes the multiplied clock 103 as its clock input to identify the input signal 101, and outputs the noise detection signal 105, which is identical with the data signal. When the input signal 101 has a proper level and the noise is relatively low, there is not any detectable noise in the noise detection signal 105. The pulse generator 13 receives the multiplied clock 103 and outputs the window pulse 104 to the alarm decision circuit 14. However, the alarm decision circuit 14 counts no noise pulse within the period of the window pulse 104, and therefore does not generate the alarm pulse 107. Next, an example of the operation of the circuit for monitoring the optical signal level in the case where the optical signal level is lowered or becomes nearly zero will be explained with reference to FIGS. 3 and 8. If the optical signal level is lowered, the APC circuit configured by the APD 2, amplifier 3, and feedback control circuit 4 (see FIG. 2) operates to increase the amplification factor of the optical signal to compensate the reduction in the level. However, this results in the level of noises, such as the surge noises introduced by the transmission line or the shot noises generated by the APD, being relatively increased and superimposed on each of the H level and L level sections of the input data signal 101. The operations of the clock extraction circuit 16 and frequency multiplier 11 are the same as described above. The noise identification circuit 12 utilizes the multiplied clock 103 as its clock input to identify the input signal 101 on which noises, such as the surge noises, are superimposed, and outputs the noise detection signal 105. The noise identification circuit 12 recognizes the noises as instantaneous level fluctuations of the amplitude of the input signal, and detects the points of the level fluctuations as pulses. The noise detection signal 105 is input to the alarm decision circuit 14. In the alarm decision circuit 14, the H/L inverter 141 shown in FIG. 4 inverts the H level section of the data signal and outputs the noise pulses 106. Then, the counter circuit 142 counts the noise pulses 106 for each period of the window pulse 104, and, in this example, outputs one alarm pulse 107 when the number of the counted noise pulses reaches five. The condition for outputting the alarm pulse 107 (in other words, the number of the noise pulses) may be arbitrarily set.

Since the level and number of the introduced noises are increased as the optical signal level is lowered, it becomes difficult to extract the clock 102. However, the alarm pulses are normally output while the clock 102 can be extracted. Furthermore, the clock extract circuit 16, which is provided with the phase-locked loop circuit, may output the clock having the specific frequency even if the break in the optical signal occurs. Thus, the noise identification circuit 12 continues the noise detecting operation.

As described above, the circuit for monitoring the optical signal level according to the present invention may count the number of the surge noises, which are increased as the input optical signal level is lowered, and output the alarm pulses. The circuit for monitoring the optical signal level may be readily integrated and detect the reduction in the optical signal level or break in the optical signal with reliability.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A circuit for monitoring an optical signal level provided in an optical receiver, comprising:

a clock extraction circuit for extracting a clock from an input signal;

a noise detection circuit for detecting surge noises included in the input signal; and an alarm circuit for counting noise pulses output from the noise detection circuit and outputting an alarm signal based on the number of said counted pulses, wherein said noise detection circuit comprises:
a frequency multiplier for multiplying the frequency of the clock and outputting a multiplied clock; and
a noise identification circuit for utilizing the multiplied clock to identify surge noises and outputting a noise detection signal including the noise pulses.

2. A circuit for monitoring an optical signal level provided in an optical receiver, comprising:

a clock extraction circuit for extracting a clock from an input signal;

a noise detection circuit for detecting surge noises included in the input signal; and an alarm circuit for counting noise pulses output from the noise detection circuit and outputting an alarm signal based on the number of said counted pulses, wherein the alarm circuit comprises:
a pulse generator for generating a window pulse having a predetermined period; and
an alarm decision circuit for counting the noise pulses detected within the period of the window pulse and outputting an alarm pulse when the number of said counted noise pulse reaches a preset value.

3. The circuit for monitoring the optical signal level according to claim 2, wherein the pulse generator generates the window pulse having the predetermined period based on the clock output from the clock extraction circuit and outputs the window pulse.

4. The circuit for monitoring the optical signal level according to claim 2, wherein the alarm decision circuit comprises:

an H/L inverter for inverting an H level portion to an L level; and a counter circuit for counting the noise pulses output from the H/L inverter within the period of the window pulse and outputting the alarm pulse in the case where the number of said counted pulses reaches the preset value.

5. The circuit for monitoring the optical signal level according to claim 2, further comprising an alarm protection circuit for expanding the period of said window pulse, counting the alarm pulses within the expanded period, and outputting the alarm signal in the case where the number of said counted pulses reaches the preset value.

6. The circuit for monitoring the optical signal level according to claim 5, wherein the alarm protection circuit comprises:

a variable frequency divider for expanding the period of the window pulse to generate an expanded window pulse;

an alarm counter circuit for counting the alarm pulses within the period of the expanded window pulse and outputting a count pulse in the case where the number of said counted pulses reaches the preset value; and an alarm output circuit for outputting the alarm signal based on the count pulse.

7. A circuit for monitoring an optical signal level provided in an optical receiver, comprising:

a clock extraction circuit for extracting a clock from an input signal;

a noise detection circuit for detecting surge noises included in the input signal; and an alarm circuit for counting noise pulses output from the noise detection circuit and outputting an alarm signal based on the number of said counted pulses, wherein the clock extraction circuit outputs a clock having a specific frequency if no signal is input.

8. A circuit for monitoring an optical signal level comprising:

detecting surge noises included in an input signal as noise pulses;

counting the number of a pulse within a predetermined period; and outputting an alarm signal when a count value of the pulse reaches a preset value, wherein the surge noise comprises a noise having a level which is relatively increased as an input signal level is lowered.

9. A circuit for monitoring an optical signal level comprising:

detecting surge noises included in an input signal as noise pulses;

counting the number of a pulse within a predetermined period; and outputting an alarm signal when a count value of the pulse reaches a preset value, wherein the detecting the surge noises included in the input signal as noise pulses comprises:

extracting a clock from the optical signal;

multiplying said clock and generating a multiplied clock; and utilizing the multiplied clock to identify the surge noises and outputting a noise detection signal including the noise pulses.

10. An optical receiver provided with a circuit for monitoring an optical signal level, comprising:

a light receiving element for transducing an input optical signal to an electric signal;

a control circuit for controlling the light receiving element based on an output of the light receiving element;

a clock extraction circuit for extracting a clock from an output signal from the light receiving element;

an identification circuit for identifying a data signal based on said clock;

a noise detection circuit for detecting surge noises included in an input signal; and an alarm circuit for counting noise pulses output from the noise detection circuit and outputting an alarm signal based on the number of said pulses.

11. The optical receiver according to claim 10, wherein the noise detection circuit comprises:

a frequency multiplier for multiplying the frequency of said clock and outputting a multiplied clock; and a noise identification circuit for utilizing the multiplied clock to identify surge noises and outputting a noise detection signal including the noise pulses.

12. The optical receiver according to claim 10, wherein the alarm circuit comprises:

a pulse generator for generating a window pulse having a predetermined period; and an alarm decision circuit for counting the noise pulses detected within the period of the window pulse and outputting an alarm pulse when the number of said counted noise pulse reaches a preset value.

* * * * *